Dec. 17, 1957  F. D. EZEKIEL  2,816,441
VARIABLE ORIFICE FLOWMETER
Filed Jan. 5, 1954  2 Sheets-Sheet 1
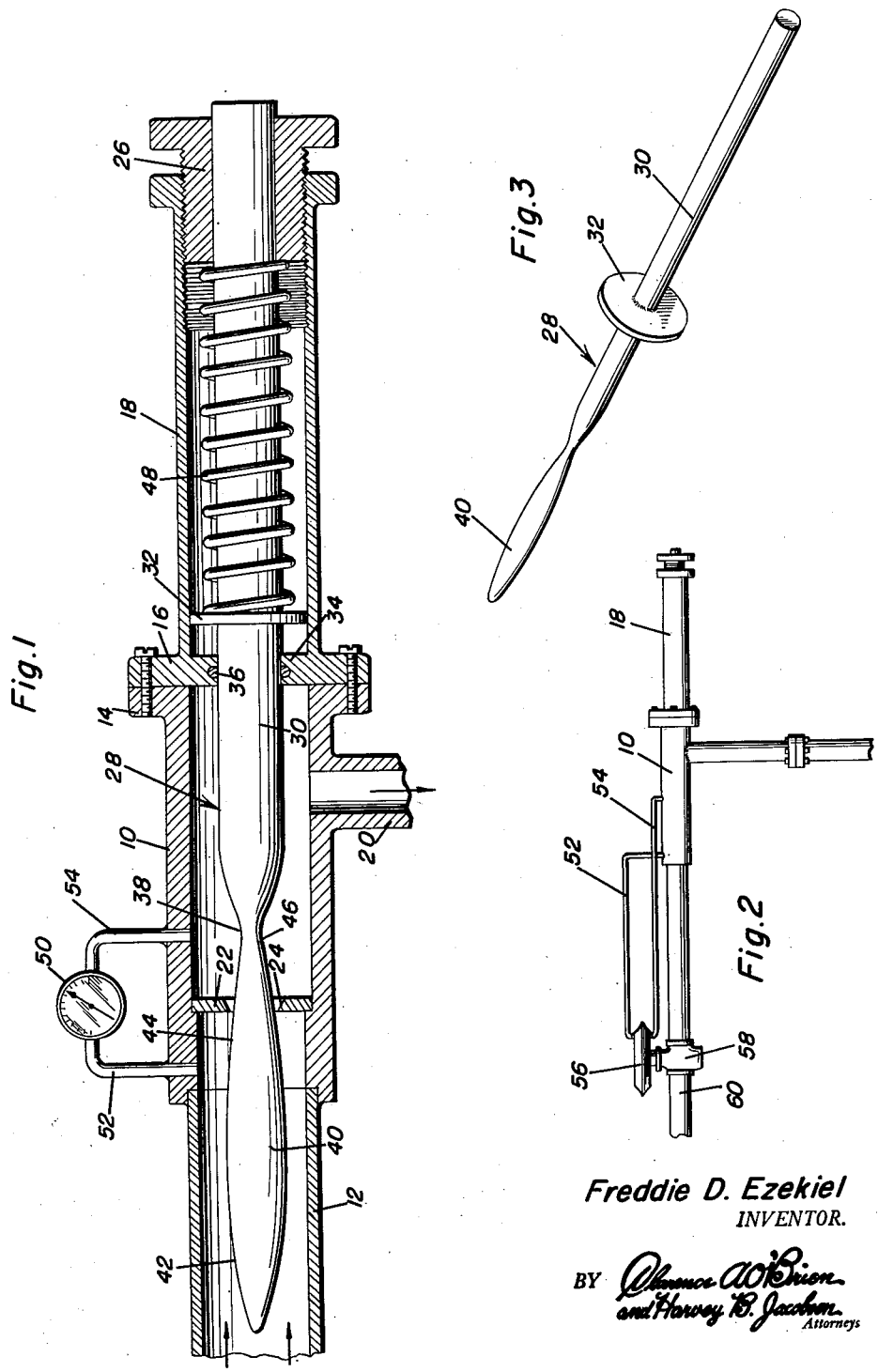
Freddie D. Ezekiel
INVENTOR.
BY *Clarence A. O'Brien*
*and Harvey B. Jacobson*
Attorneys

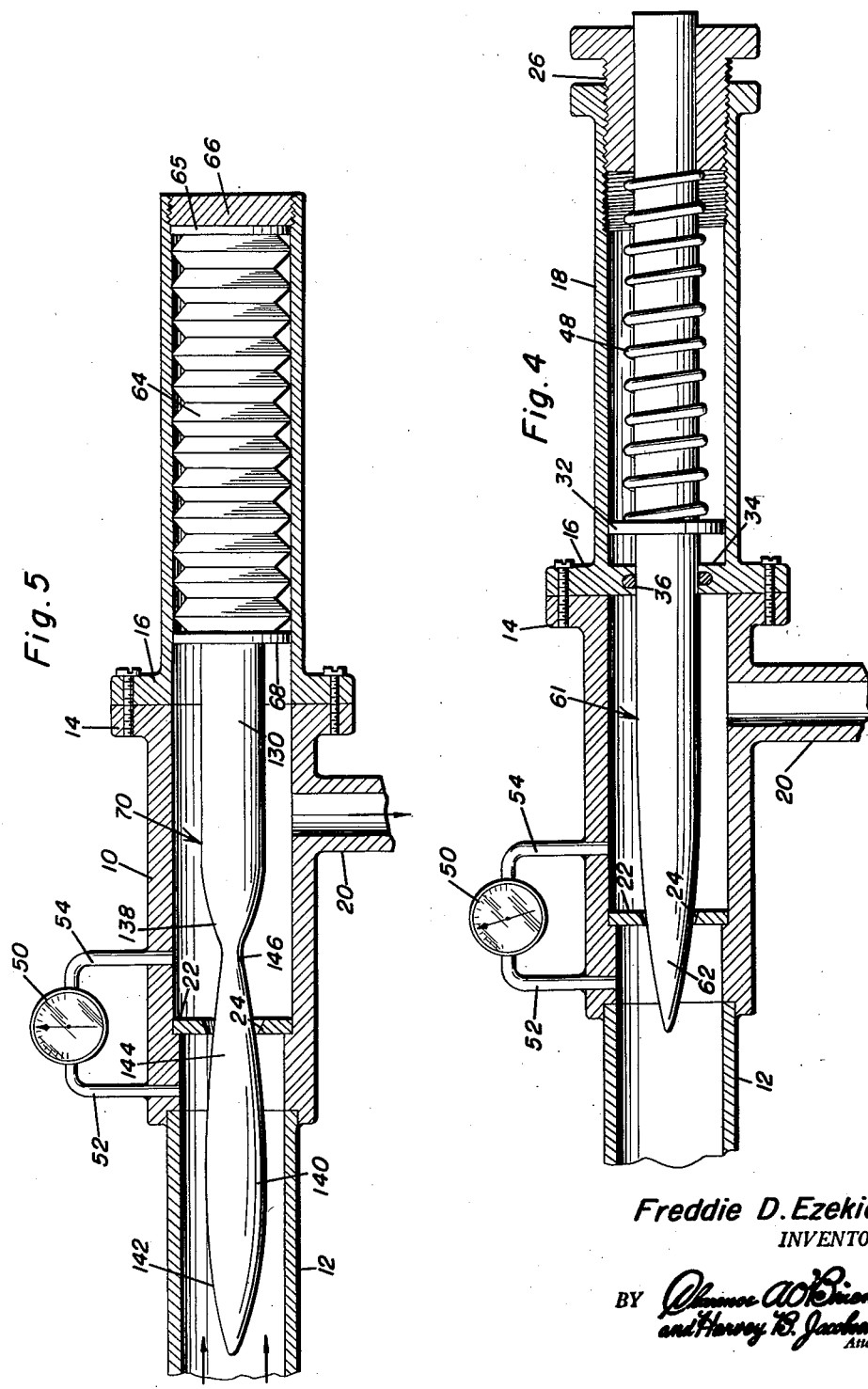

United States Patent Office 2,816,441
Patented Dec. 17, 1957

2,816,441

VARIABLE ORIFICE FLOWMETER

Freddie D. Ezekiel, Cambridge, Mass.

Application January 5, 1954, Serial No. 402,285

2 Claims. (Cl. 73—207)

This invention relates generally to flowmeters and pertains more particularly to an improved form of such mechanisms particularly adapted for use with compressible fluids.

A primary object of this invention is to provide an improved form of mechanism of the character described in which means are provided for mechanically reducing the compressible fluid flow equation to a single variable whereby a single differential pressure mechanism is rendered responsive to the flow of fluid through the device.

Another object of this invention is to greatly simplify the mechanism necessary for determining fluid flow and to permit a single indicator to be utilized in directly reading the fluid flow.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an enlarged longitudinal section taken through the flowmeter;

Figure 2 is an elevational view showing the device connected in a manner to operate as a fluid flow regulator;

Figure 3 is a perspective view of the metering plunger;

Figure 4 is a view similar to Figure 1 but showing a modified form of construction; and Figure 5 is another view similar to Figure 1 but showing a still further modified form of construction.

Considering first the orifice flow equation for compressible fluids $$W = CA\sqrt{2(\Delta P)\rho} = CA\sqrt{2(\Delta P)\frac{P}{RT}}$$

where $W$ = mass rate of flow
$C$ = over-all orifice coefficient
$A$ = orifice area
$\Delta P$ = pressure drop across orifice
$\rho$ = density of fluid
$P$ = absolute pressure of fluid
$R$ = fluid gas constant
$T$ = absolute temperature of fluid and rewriting the same as $$W = C\sqrt{\frac{2}{RT}}(A\sqrt{P})\sqrt{\Delta P}$$

and assuming $$C\sqrt{\frac{2}{RT}}$$

to be constant for all practical considerations, it is manifest that if the product of any two of the variables A, $\sqrt{P}$ or $\sqrt{\Delta P}$ is maintained constant, the mass rate of fluid flow may be determined by merely reading a single indicator which may be calibrated directly as mass rate of flow and in units thereof. It is toward this end that this invention is directed, and the means by which this is accomplished will be readily apparent by reference to Figure 1. Reference numeral 10 indicates the tubular main body portion of the device which is open at one end and receives a pipe or inlet member 12, in the manner shown. The opposite end of the body 10 is flanged, as at 14, and a similar flange 16 on the cylinder member 18 is rigidly affixed thereto by any suitable means, such as the fasteners shown.

An outlet connection 20 is provided at an intermediate point on the body 10 and a partition member 22 is fixed within the body between the inlet and outlet thereof, this member forming a restricted orifice 24 in the manner set forth.

The free end of the cylinder 18 is internally threaded to receive an abutment plug 26. The plunger or metering device, indicated generally by the reference character 28, consists of a shank 30 having a collar or piston member 32 thereon which is guidably received in cylinder 18. One end of the cylinder is provided with an inwardly directed collar 34 whose central opening is grooved to retain an O-ring 36 sealingly engaging against the shank of the plunger. The free end of the plunger projects through and is guidably received in the plug 26. The guiding action of the piston 32 in the cylinder 18 taken with the close fit between the shank 30 and plug 26 serves to relieve the O-ring of undue lateral forces which might otherwise impair its sealing operation.

The inner end of the shank is necked down as at 38, although it is to be understood that the existence or absence of such necking down is entirely dependent upon the dimensions of the shank and the dimensions of the orifice 24. At any rate, the plunger terminates in an enlarged head 40 either integrally formed with the shank or separately made and affixed thereto, the opposite ends of the head being tapered as at 42 and 44 such as to produce a portion 46 of reduced diameter where the shank and head merge.

This reduced portion and the tapered portion 44 of the head are located in the region of the orifice 24 and are adapted to be movable through the orifice in a manner presently set forth. The other tapered end 42 of the head is shaped in a suitable manner to permit smooth flow of gas, the direction being as indicated by the arrows in Figure 1. A coil spring 48 engaging against the plug 26 on the one hand and against the piston member 32 on the other normally urges the plunger inwardly of the body 10 with the portion 46 of reduced diameter positioned in orifice 24 when the piston 32 abuts the collar 34.

Operation

In operation, the static pressure of the gas will cause the plunger to move in opposition to the spring 48, moving the tapered end 44 of the head into the orifice. Of course, the amount of movement is dependent upon the pressure differential existing between the static pressure of the gas and the prevailing atmospheric pressure and the spring constant of member 48. Now it will be clear that the contour or profile of the tapered end 44 of the head is formed such that the product of the two variables $\sqrt{P}$ and A will remain constant. The plug 26, of course, is initially adjusted to obtain the proper tension on spring 48.

Since the product of A $\sqrt{P}$ is held constant, the single remaining variable $\Delta P$ may be utilized to read the mass rate of flow directly. For this reason, the differential pressure gauge 50 is connected across the partition member 22 by suitable lines 52 and 54. If desired, the gauge may be calibrated in units of mass rate of flow or a conversion table may be used.

Referring now more particularly to Figure 2, it will be seen that the principle involved may be used to regulate fluid flow by merely replacing the differential pressure gauge with a valve actuator 56 connected to a valve 58 in the inlet line 60. In this manner, it will be seen that dependent upon the initial set-up between the valve actuator and the valve, a desired quantity of fluid flow may be regulated by this assembly.

It will be noted that by modifying the construction of the plunger 28, the operation of the device may be changed so as to hold the value of $$\frac{A}{\sqrt{P}}$$

constant such that in the formula $$Q = C\sqrt{2RT}\left[\frac{A}{\sqrt{P}}\right]\sqrt{\Delta P}$$

where Q equals the volumetric rate of flow, the volumetric rate of flow may be read directly as a function of $\sqrt{\Delta P}$, as before.

In this instance, the change necessary in the construction of the plunger 61 is as is illustrated in Figure 4, wherein the free end of the same 62 is of progressively decreasing cross-sectional area, toward the free end. With no flow through the meter, the plunger will be urged by the spring 48 to a position completely closing the orifice opening. As flow is introduced, dependent upon the value of $\sqrt{P}$, the plunger will be moved to the right in Figure 5 so as to permit a larger effective orifice area. In other words, as $\sqrt{P}$ is increased, A is also increased by retraction of the plunger. Other than that the modified plunger tapers progressively to a point, the construction remains the same as in Figure 1.

Referring now more particularly to Figure 5, a further modification is shown wherein the value of W may be determined in a manner similar to the application of Figure 1 with the exception that the flow rate reading will be unaffected by either temperature or pressure, a feature desirable in many applications. This is accomplished by the provision of the bellows member 64 closed at one end by a disk 65 abutting the cap 66 and provided at its other end with a disk 68 secured to the end of the plunger 70 which is formed generally the same as plunger 28 previously described. That is, plunger 70 has a reduced portion 146, an enlarged head 140 having its opposite ends 142 and 144 tapered as shown, and a shank 130 tapering, as at 138, into the reduced portion 146.

Now let $V_c$ = the volume of the bellows chamber
$S_c$ = the area of the end disk
$m_c$ = mass of gas inside the chamber
$P_c$ = the absolute pressure in the chamber
$\rho_c$ = the density of the gas in the chamber
$X$ = length of the chamber at any time Therefore $$V_c = S_c X, \text{ and } \rho_c = \frac{m_c}{V_c} = \frac{m_c}{S_c X}$$

The bellows will be formed of material of sufficient flexibility such that the stresses set up in its walls will be negligible so that for practical purposes, the pressure inside the chamber can be considered equal to the pressure of the flowing fluid.

Also, since the bellows is in direct contact with the flowing fluid, the temperature of the fluid within the bellows chamber can, for all practical considerations, be considered the same as the moving fluid. Therefore, with the same fluid being utilized in the chamber as is flowing through the meter, the density of the flowing fluid will be the same as the fluid within the chamber. Hence, writing the flow equation through an orifice $$W = CA\sqrt{2\Delta P \rho}$$

the quantity $\rho_c$ may be substituted for the quantity $\rho$. Thus, $$W = CA\sqrt{2\Delta P \rho_c} = CA\sqrt{2\Delta P \frac{m_c}{S_c X}} = C\sqrt{\frac{2m_c}{S_c}}\left[\frac{A}{\sqrt{X}}\right]\sqrt{\Delta P}$$

Therefore, if the expression $$\frac{A}{\sqrt{X}}$$

is held constant by properly contouring the member 70, the mass rate of flow W can be determined directly from the pressure drop across the orifice as indicated by the gauge 50, the expression $$C\sqrt{\frac{2m_c}{S_c}}$$

being assumed constant. Thus, the rate of flow will be independent of both temperature and pressure.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A flowmeter for compressible fluids comprising a casing having an inlet and an outlet, a partition member formed with an orifice between said inlet and outlet, a plunger having a shank projecting through one wall of the casing, an enlarged head on the inner end of said shank and disposed on the upstream side of said partition member so that said head is subject to inlet pressure tending to move said shank in the direction of flow, said head and shank being joined by a portion of reduced diameter, said head being tapered so as to be of increasing cross-sectional area from said reduced portion, said reduced portion being movable within said orifice, means normally urging the enlarged head of the shank away from said partition member and in a direction opposite to the flow through said casing with such force that the product of orifice area times the square root of the pressure is a constant, the other end of the shank being exposed to the atmosphere, and a differential pressure gauge connected across said partition member for directly indicating flow through the casing.

2. A flowmeter comprising a tubular member having an inlet and an outlet and an apertured end wall, a partition member having a restricted orifice between said inlet and outlet, a plunger including a shank slidably received in said apertured end wall and a portion of reduced diameter movable in said orifice, said plunger also including an enlarged head on its inner end upstream of said orifice and exposed to inlet pressure, said head being tapered downwardly by gradually being reduced in cross section toward said portion of reduced diameter and smoothly joined with said portion of reduced diameter, the opposite end of said plunger being exposed to the atmosphere, resilient means urging said plunger inwardly of said tubular member with such force that the product of orifice area times the square root of the pressure is a constant, and a differential pressure gauge connected across said partition member for directly indicating the flow rate of compressible fluid through said tubular member.

(References on following page)

References Cited in the file of this patent

UNITED STATES PATENTS

| | | |
|---|---|---|
| 1,787,686 | Kerr | Jan. 6, 1931 |
| 2,303,640 | Hogg | Dec. 1, 1942 |
| 2,367,544 | Udale | Jan. 16, 1945 |
| 2,647,402 | Ibbott | Aug. 4, 1953 |
| 2,650,607 | Bryant | Sept. 1, 1953 |
| 2,675,020 | Breitwieser | Apr. 13, 1954 |

FOREIGN PATENTS

| | | |
|---|---|---|
| 554,115 | France | Feb. 23, 1923 |
| 237,827 | Great Britain | Aug. 6, 1925 |